W. A. STINSON.

WHIFFLETREE AND TRACE CONNECTION.

APPLICATION FILED OCT. 12, 1911.

Reissued Mar. 5, 1912. 13,380.

Inventor

William A. Stinson

Witnesses

Gladys Jameson

C. H. Rauch

By Geo. Kirk

Attorney

COLUMBIA PLANOGRAPH CO., WASHINGTON, D. C.

UNITED STATES PATENT OFFICE.

WILLIAM A. STINSON, OF GREENWOOD, MISSISSIPPI.

WHIFFLETREE AND TRACE CONNECTION.

13,380. Specification of Reissued Letters Patent. Reissued Mar. 5, 1912.

Original No. 955,613, dated April 19, 1910, Serial No. 520,016. Application for reissue filed October 12, 1911. Serial No. 654,407.

*To all whom it may concern:*

Be it known that I, WILLIAM A. STINSON, a citizen of the United States, residing at Greenwood, Leflore county, Mississippi, have invented a new and useful Whiffletree and Trace Connection, of which the following is a specification.

This invention relates to whiffletree and trace connections.

It is common to provide whiffletrees with spring connections adapted to be compressed upon the application of the trace thereto, which springs snap back into normal position after the trace has been positioned for the purpose of preventing accidental disconnection of the trace from the whiffletree. It is common to form whiffletrees peculiarly to prevent accidental displacement of the traces.

The spring connections referred to are not altogether practical, because of breakage, complications and other defects, which render them otherwise unsatisfactory. In cases where the whiffletree has a peculiar formation, the application of an entirely new whiffletree is necessary in the event of breakage, and even where the whiffletrees are of peculiar formation, it is generally necessary to provide other means of some sort for association with the whiffletrees to prevent accidental displacement of the traces.

In the present instance, I provide an exceedingly simple fastening, which may be readily applied to any type of whiffletree and quickly removed, if desired, all without affecting the strength of the whiffletree and without marring the appearance thereof.

Another object resides in the provision of an exceedingly simple button connection which may be applied to any type of whiffletree and which, when applied, will not be subject to breakage, disconnection, or inconvenience to the person applying or removing the traces from the whiffletree and yet prevent accidental displacement of the traces.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

Figure 1:
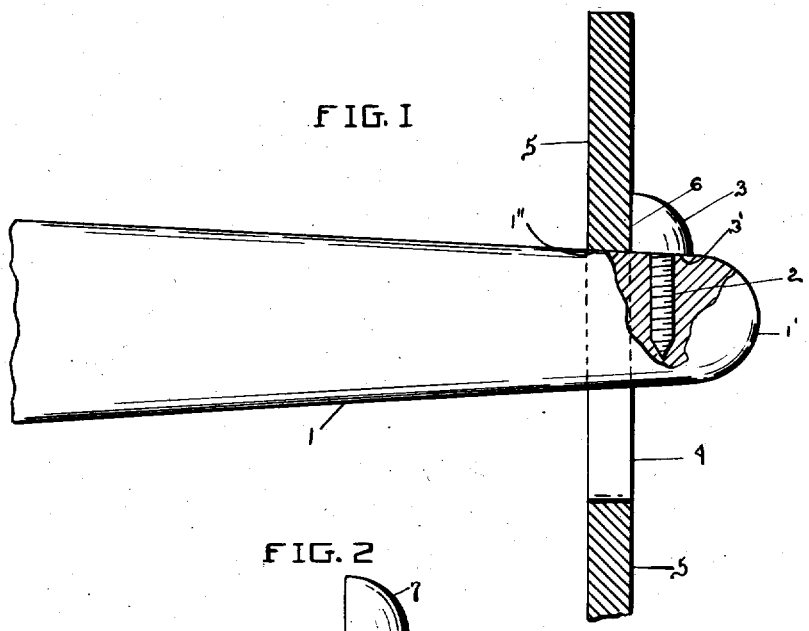
Figure 2:
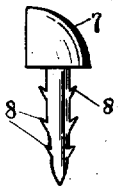
Figure 3:
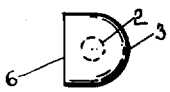
Figure 4:
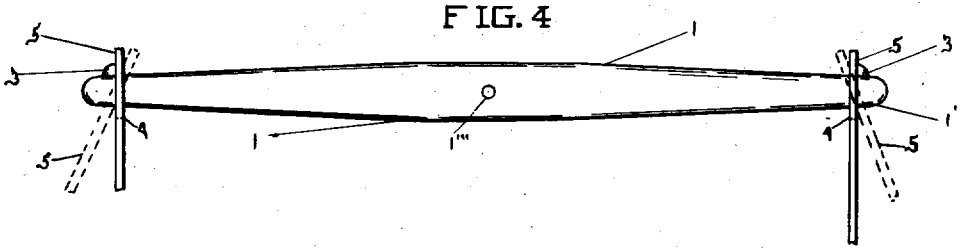

In the drawings: Figure 1 is a top plan view of a portion of one end of a whiffletree illustrating the trace applied thereto in position as not to become accidentally disconnected from the whiffletree; Fig. 2 is a detail view of a modified form of button; Fig. 3 is a plan view of the stop or button of Fig. 1; and Fig. 4 is a plan view of a whiffletree showing a pair of stops with the traces or draw members in dotted lines hooked to engage the stops and being pushed over the end of the tree into normal position for use.

Referring now more particularly to the accompanying drawings, the reference character 1 indicates a portion of a whiffletree into the back of which is screwed the screw threaded shank 2 of a button or stop 3, it being understood that one of these buttons 3 is to be used at each end of the whiffletree.

Whiffletrees usually taper toward their ends, as may be gathered from the accompanying illustration, but in any event, the ends of the whiffletrees are usually comparatively small so that the opening 4 of a trace or draw member 5 may engage seat 6 and be readily slipped over the small ends 1′ of the whiffletree 1 to pull against seat 1″.

In the present instance, the head of the button 3 disposed adjacent the extremity of the whiffletree is rounded, so that the opening 4 may be readily slipped over the same. The inner side or trace seat 6 of the button 3 is preferably flat and straight so as to provide a shoulder against which the inner end of the trace may rest, as clearly shown in Figs. 1 and 4 and by virtue of which the trace is not subject to accidental disconnection from the whiffletree, notwithstanding the stop or button is in the plane of the eye or opening 4 of the trace.

Instead of screwing the buttons 3 into the whiffletree for mounting thereon or securing thereto, as hereinbefore described, they may be driven into the same, as evidenced by the form of button shown at 7 in Fig. 2, wherein the shank 8 of the button 7 is provided with prongs to prevent disconnection of the button from the whiffletree. The main difference between the two types of buttons is that the first one is removably connected to the whiffletree, while the second one is permanently associated therewith.

From the foregoing, it will be apparent that in the event of breakage of the trace connections of the ordinary type, one of my improved buttons may be readily put into service or that, if desired, old types of connections may be removed from whiffletrees and my improved button associated therewith.

What is claimed is:—

1. An attachment for whiffletrees consisting of a button having a relatively tall body portion which has one flat edge to form a shoulder, the opposite edges of the body portion merging into said flat edge, the bottom of the body portion being flat and having a reduced centrally disposed securing shank.

2. A trace holding stop fixedly mountable on the rear side of a whiffletree a short distance from the end thereof, comprising a rearwardly extending head portion on the side next the whiffletree end, said head portion terminating in an abrupt face extending to the whiffletree on the side remote from the whiffletree end, said face forming a trace abutment seat, and holding means for mounting the stop rigidly with a whiffletree.

3. A trace holding stop fixedly mountable on the rear side of a whiffletree a short distance from the end thereof comprising a whiffletree abutting seat, holding means for mounting the stop rigidly with the whiffletree, and a face extending rearwardly from the whiffletree abutting seat on the side of the stop remote from the adjacent end of the whiffletree, said face forming a trace abutment seat.

In testimony whereof I affix my signature in the presence of two witnesses.

WILLIAM A. STINSON.

Witnesses:
GEO. E. KIRK,
GLADYS JAMESON.

Copies of this patent may be obtained for five cents each, by addressing the "Commissioner of Patents, Washington, D. C."